United States Patent
Suzuki

(10) Patent No.: US 7,304,823 B2
(45) Date of Patent: Dec. 4, 2007

(54) SUSPENSION FOR HEAD SLIDER HAVING HIGHER RESISTANCE TO VIBRATION

(75) Inventor: Hiroshi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 11/024,172

(22) Filed: Dec. 28, 2004

(65) Prior Publication Data

US 2005/0122626 A1 Jun. 9, 2005

Related U.S. Application Data

(63) Continuation of application No. PCT/JP02/11197, filed on Oct. 29, 2002.

(51) Int. Cl.
G11B 5/48 (2006.01)
(52) U.S. Cl. .................... 360/244.3; 360/244.9
(58) Field of Classification Search ............ 360/244.9, 360/244.3
See application file for complete search history.

(56) References Cited

U.S. PATENT DOCUMENTS

| | | | | |
|---|---|---|---|---|
| 4,991,045 A * | 2/1991 | Oberg | .............. | 360/244.3 |
| 5,715,117 A * | 2/1998 | Brooks | .............. | 360/244.5 |
| 5,796,553 A * | 8/1998 | Tangren | .............. | 360/244.9 |
| 5,949,617 A * | 9/1999 | Zhu | .............. | 360/244.8 |
| 6,215,623 B1 * | 4/2001 | Zhu | .............. | 360/244.3 |
| 6,297,933 B1 * | 10/2001 | Khan et al. | .............. | 360/244.2 |
| 6,697,225 B2 * | 2/2004 | Wittig et al. | .............. | 360/244.9 |
| 6,751,065 B2 * | 6/2004 | Smith et al. | .............. | 360/244.9 |
| 6,992,861 B2 * | 1/2006 | Suzuki et al. | .............. | 360/244.3 |
| 2002/0109943 A1 * | 8/2002 | Crane et al. | .............. | 360/244.3 |
| 2003/0202284 A1 * | 10/2003 | Arya | .............. | 360/244.3 |
| 2004/0264055 A1 * | 12/2004 | Wright | .............. | 360/244.9 |
| 2005/0190502 A1 * | 9/2005 | Sassine et al. | .............. | 360/244.8 |

FOREIGN PATENT DOCUMENTS

| | | |
|---|---|---|
| JP | 62-16163 | 10/1987 |
| JP | 4-109468 | 4/1992 |
| JP | 5-174507 | 7/1993 |
| JP | 7-32752 | 6/1995 |
| JP | 8-147914 | 6/1996 |
| JP | 2000-132923 | 5/2000 |
| WO | WO 98/37559 | 8/1998 |

* cited by examiner

Primary Examiner—Brian E. Miller
(74) Attorney, Agent, or Firm—Greer, Burns & Crain, Ltd.

(57) ABSTRACT

A suspension for a head slider includes a load beam. A base material of the load beam is covered with first and second elastic films extending on the front and back surfaces of the base material. The second elastic film is continuous with the first elastic film. The suspension is exposed to a high speed airflow. Vibrations induced through torsional deformation and/or flexural deformation are induced in response to the influence of the high speed airflow. Since the front and back surfaces of the load beam are covered with the first and second elastic films, the resonance to the vibrations induced through torsional deformation and/or flexural deformation can be attenuated based on damping performance of the first and second elastic films. The load beam is reliably prevented from suffering from vibrations based on torsional deformation and/or flexural deformation.

11 Claims, 4 Drawing Sheets

SUSPENSION FOR HEAD SLIDER HAVING HIGHER RESISTANCE TO VIBRATION

This is a continuation of International PCT Application No. PCT/JP2002/011197 filed Oct. 29, 2002.

BACKGROUND OF THE INVENTION

1. Field of the Invention

The present invention relates to a suspension assembled within a recording medium drive or storage device such as a hard disk drive (HDD) so as to support a head slider opposed to a recording medium. In particular, the invention relates to a suspension for a head slider, comprising a base plate; a load beam extending forward from the tip or front end of the base plate; a rigid portion defined in the load beam at a location spaced from the base plate by a predetermined distance; and an elastic deformable portion defined in the load beam between the rigid portion and the base plate for exhibiting a predetermined elasticity.

2. Description of the Prior Art

A high speed airflow is generated along the surface of a magnetic recording disk during the rotation of the magnetic recording disk in a hard disk drive (HDD). A head suspension assembly is exposed to the high speed airflow in the HDD. The high speed airflow causes vibrations based on torsional deformation and/or flexural deformation at the rigid portion of a load beam in the head suspension assembly.

A plate member is overlaid on the surface of the load beam at the rigid portion so as to prevent the vibrations based on torsional deformation and/or flexural deformation. The plate member is made of a polyimide film, a steel plate, or the like. An improved rigidity of the rigid portion serves to suppress the vibrations based on torsional deformation and/or flexural deformation in the load beam.

The magnetic recording disks should still further rotate at a higher rotation speed in the HDD. The influence of the airflow is expected to increase. The plate member is further required to have a higher rigidity to surely prevent the vibrations based on torsional deformation and/or flexural deformation in the aforementioned manner. If the improved rigidity induces an increase in the thickness of the plate member, the weight of the load beam increases. The head suspension assembly may suffer from a deteriorated accuracy in positioning.

SUMMARY OF THE INVENTION

It is accordingly an object of the present invention to provide a suspension for a head slider capable of efficiently suppressing vibrations based on torsional deformation and/or flexural deformation in a load beam.

According to a first aspect of the present invention, there is provided a suspension for a head slider, comprising: a base material of a load beam; a first elastic film extending on the front surface of the base material; and a second elastic film extending on the back surface of the base material, said second elastic film being continuous with the first elastic film. Here, the base material and the first and second elastic films cooperate to form a load beam.

When the surface of a magnetic recording medium moves at a higher velocity relative to the head slider on the suspension, for example, the suspension is exposed to a high speed airflow. Vibrations induced through torsional deformation and/or flexural deformation are induced in response to the influence of the high speed airflow. Since the front and back surfaces of the load beam are covered with the first and second elastic films, the resonance to the vibrations induced through torsional deformation and/or flexural deformation can be attenuated based on damping performance of the first and second elastic films. The load beam is reliably prevented from suffering from vibrations based on torsional deformation and/or flexural deformation. In particular, if resin material is employed to form the elastic films, the weight of the suspension can be reduced.

At least one of the first and second elastic films may have a thickness getting smaller at a location nearer to the edge of the base material. Specifically, the outer surfaces of the base material and the first and second elastic films may cooperate to form a streamlined outline. The streamlined outline of the load beam serves to prevent generation of swirl in the airflow flowing along the load beam. Vibration can thus sufficiently be suppressed in the load beam. Moreover, minute protrusions or minute dimples may be located over at least one of the outer surfaces of the first and second elastic films. Protrusions and dimples contribute to suppression of generation of swirl.

The suspension allows connection between the first and second elastic films inside a through hole defined in the base material. Otherwise, the first elastic film may be connected to the second elastic film around the edge of the base material. Resin material may be employed to realize the connection through molding process. The base material may be included within a molded resin material.

According to a second aspect of the present invention, there is provided a head suspension assembly comprising: a base material of a load beam; a flexure overlaid on the front surface of the base material, said flexure receiving a head slider; a first elastic film extending over the front surface of the base material, said first elastic film covering over the flexure; and a second elastic film extending over the back surface of the base material, said second elastic film continuous with the first elastic film. Here, the base material and the first and second elastic films cooperate to form a load beam.

When the surface of a magnetic recording medium moves at a higher velocity relative to the head slider, for example, the load beam is exposed to a high speed airflow. Vibrations based on torsional deformation and/or flexural deformation are induced in response to the influence of the high speed airflow in the load beam. Since the front and back surfaces of the load beam are covered with the first and second elastic films, the resonance to the vibrations induced through torsional deformation and/or flexural deformation can be attenuated based on damping performance of the first and second elastic films. The load beam is reliably prevented from suffering from vibrations based on torsional deformation and/or flexural deformation. Moreover, the first elastic film serves to fix the flexure on the load beam in the head suspension assembly.

The first elastic film may define a wall surface opposed to a wall surface of the head slider in the head suspension assembly. In this case, the thickness of the first elastic film may be set equal to the thickness of the head slider. The first elastic film serves to rectify the airflow, flowing along the head slider, at the front and rear of the head slider. Generation of swirl is prevented to the utmost at the front and rear of the head slider. Vibration can thus efficiently be suppressed in the head slider.

According to a third aspect of the present invention, A suspension for a head slider, comprising: a base material of a load beam; a first fairing material extending on the front surface of the base material; and a second fairing material extending on the back surface of the base material, wherein the outer surfaces of the base material and the first and second fairing materials cooperate to form a streamlined outline. Here, the base material and the first and second fairing materials cooperate to form a load beam.

The streamlined outline of the load beam serves to prevent generation of swirl in the airflow flowing along the load beam. Vibration can thus sufficiently be suppressed in the load beam. In particular, the base material and the first and second fairing materials may cooperate to form a wing section. The wing section may be formed in accordance with the direction of airflow. The suspension may be utilized in a head suspension assembly. The head suspension assembly may further include a flexure overlaid on the front surface of the base material so as to receive a head slider.

According to a fourth aspect of the present invention, there is provided a head suspension assembly comprising: a base material of a load beam; a flexure overlaid on the front surface of the base material; a head slider received on the front surface of the flexure; a fairing material formed on at least one of the front surfaces of the base material and the flexure, said fairing material defining a wall surface opposed to a wall surface of the head slider. Here, the thickness of the fairing material may be set equal to that of the head slider.

The fairing member serves to efficiently rectify airflow, flowing along the head slider, at the front and rear of the head slider. Generation of swirl can be avoided at the front and rear of the head slider. Vibration can thus further efficiently be suppressed in the head slider.

According to a fifth aspect of the present invention, there is provided a base plate; a load beam extending forward from the base plate; a rigid portion defined in the load beam, said rigid portion spaced from the base plate by a predetermined distance; an elastic deformable portion defined in the load beam between the rigid portion and the base plate, said elastic deformable portion exhibiting a predetermined elasticity; and an elastic piece connecting the rigid portion to the base plate. The elastic piece serves to attenuate vibration at the elastic deformable portion of the load beam in the head suspension assembly.

The elastic piece may be located in parallel with the elastic deformable portion at a position spaced from the elastic deformable portion by a predetermined distance in the head suspension assembly. The elastic piece may be integral to an elastic film extending on the surface of the load beam at the rigid portion.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
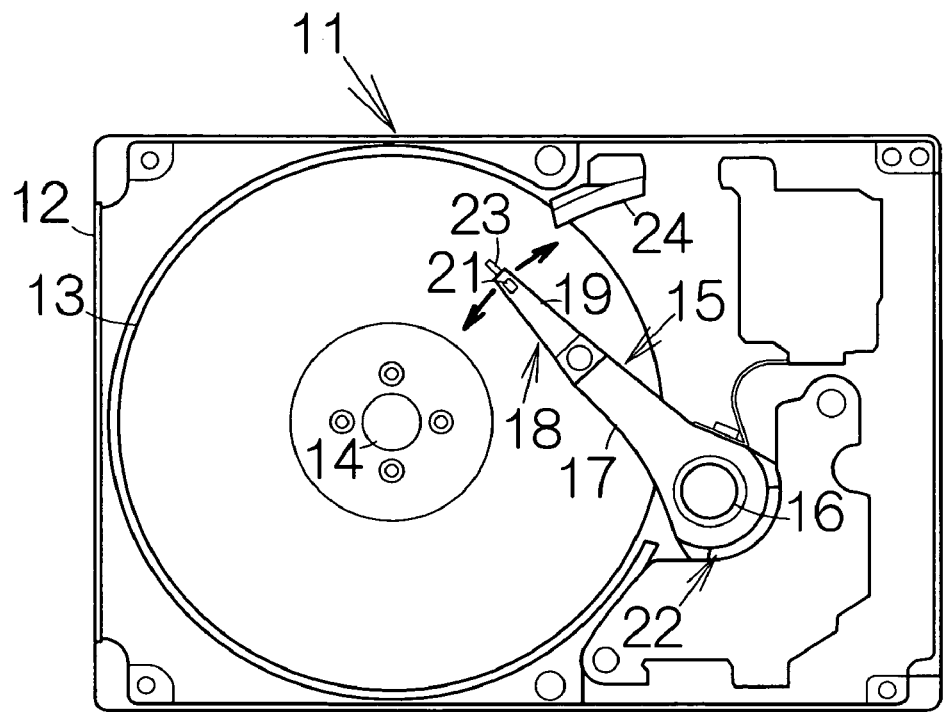
FIG. 1 is a plan view schematically illustrating the structure of a hard disk drive (HDD) as an example of a recording medium drive.

FIG. 1 schematically illustrates the inner structure of a hard disk drive (HDD) 11 as an example of a recording medium drive or storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and itself.

A head actuator 15 is also incorporated in the inner space of the main enclosure 12. The head actuator 15 is coupled to a vertical support shaft 16 for relative rotation. The head actuator 15 comprises actuator arms 17 extending in the horizontal direction from the vertical support shaft 16, and head suspension assemblies 18 respectively attached to the tip ends of the actuator arms 17 so as to extend in the forward direction from the actuator arms 17. An elastic suspension 19 extends forward from the front or tip end of the actuator arm 17 in the head suspension assembly 18. As conventionally known, a flying head slider 21 is supported at the front or tip end of the elastic suspension 19. A write head element and a read head element, both not shown, are mounted on the flying head slider 21. The write head element may be a thin film magnetic head utilized to write information data into the magnetic recording disk 13, for example. The read head element may be a magnetoresistive (MR) element utilized to read information data out of the magnetic recording disk 13, for example. The magnetoresistive element may be a spin valve film, a tunnel junction film, or the like.

The elastic suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during rotation of the magnetic recording disk 13 at a higher stability established by the balance between the lift and the urging force of the elastic suspension 19.

When the head actuator 15 is driven to swing around the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. In this case, a power source 22 such as a voice coil motor (VCM) can be employed to realize the swinging movement of the head actuator 15, for example. As conventionally known, in the case where two or more magnetic recording disks 13 are incorporated within the inner space of the main enclosure 12, a pair of the actuator arms 17, namely a pair of the head suspension assembly 18 is located between the adjacent magnetic recording disks 13.

A load bar 23 is attached to the front end of the individual elastic suspension 19. The load bar 23 further extends in the forward direction from the load beam 19. The load bar 23 is allowed to move in the radial direction of the magnetic recording disk 13 based on the swinging movement of the actuator arm 17. A ramp member 24 is located outside the magnetic recording disk 13 on the paths of movement of the load bars 23.

When the magnetic recording disk 13 stands still, the actuator arm 17 is positioned at the inoperative position. When the actuator arm 17 is positioned at the inoperative position in this manner, the flying head slider 21 reaches a position outside the magnetic recording disk 13 beyond the outermost recording track. The load bar 23 is received on the ramp member 24, so that the flying head slider 21 is surely prevented from contact with the magnetic recording disk 13 irrespective of loss of the lift. The combination of the load bar 23 and the ramp member 24 establishes a so-called load/unload mechanism.

Figure 2:
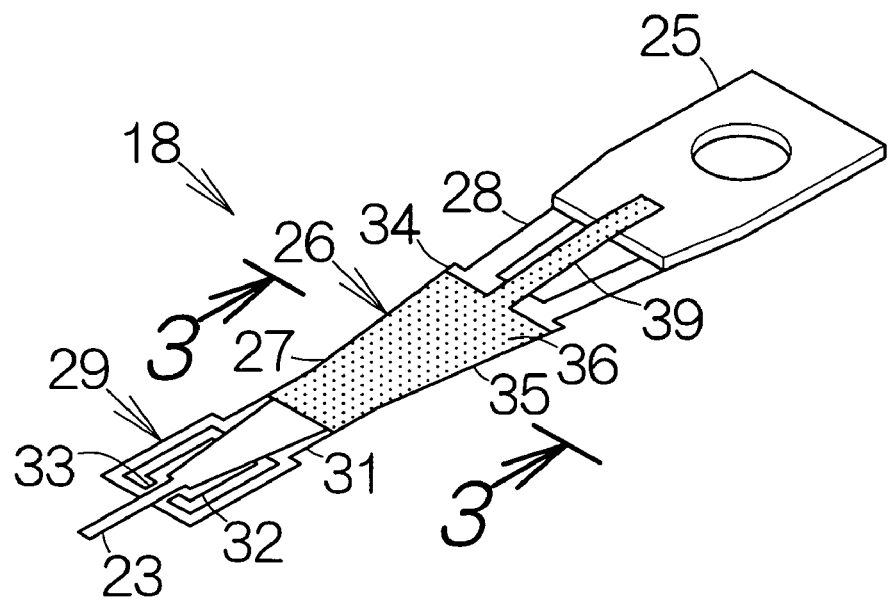
FIG. 2 is an enlarged perspective view of a head suspension assembly according to an embodiment of the present invention.

As shown in FIG. 2, the elastic suspension 19 includes a base plate 25 received on the front end of the actuator arm 17 and a load beam 26 extending forward from the base plate 25. A rigid portion 27 and an elastic deformable portion 28 are defined in the load beam 26. The rigid portion 27 is spaced from the base plate 25 by a predetermined distance. The elastic deformable portion 28 is defined between the rigid portion 27 and the base plate 25. The base plate 25 may be fixed to the actuator arm 17 based on laser welding, for example.

A flexure 29 is fixed to the front end of the load beam 26. The flexure 29 includes a fixation plate 31 fixed to the surface of the load beam 26 and a support plate 32 receiving the flying head slider 21 at its surface. Adhesive may be employed to adhere the flying head slider 21 on the support plate 32. A gimbal spring 33 is utilized to couple the support plate 32 with the fixation plate 31. When the flexure 29 is attached to the load beam 26, the back surface of the fixation plate 31 is received on a domed protrusion, not shown, formed on the front surface of the load beam 26.

The elastic deformable portion 28 is designed to exhibit a predetermined rigidity or flexural force. This flexural force serves to generate at the front end of the rigid portion 27 an urging force directed to the surface of the magnetic recording disk 13. The urging force acts on the flying head slider 21 from the back of the support plate 32 through the protrusion. The flying head slider 21 is allowed to change its attitude based on a lift due to the influence of the airflow. The protrusion allows changes in the attitude of the flying head slider 21 or the support plate 32.

The load beam 26 includes a base material made of metal such as stainless steel, namely a metallic plate 34. First and second elastic films 35, 36 covers over the front and back surfaces, respectively, of the metallic plate 34 at least at the rigid portion 27. The first and second elastic films 35, 36 may be made of resin material, for example. The aforementioned load bar 23 may integrally be formed at the front end of the metallic plate 34.

Figure 3:
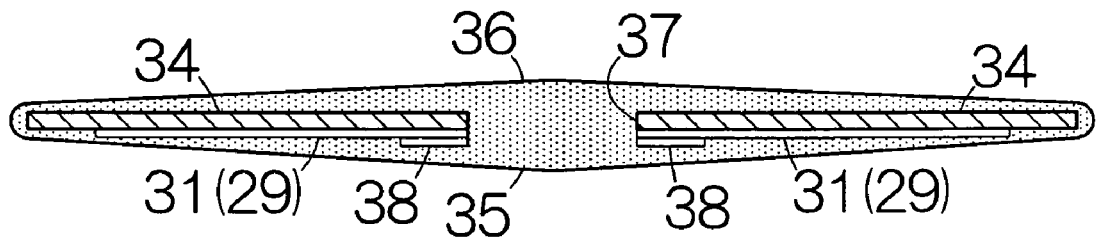
FIG. 3 is an enlarged sectional view taken along the line 3-3 in FIG. 2.

As is apparent from FIG. 3, the first and second elastic films 35, 36 are continuous to each other. Here, the first and second elastic films 35, 36 are connected to each other inside a through hole 37 formed in the metallic plate 34. At the same time, the first and second elastic films 35, 36 are connected to each other around the edge of the metallic plate 34. Molding process is utilized to realize the connection, for example. The metallic plate 34 may be included within the resin material. In this case, the metallic plate 34 may be included within the resin material along with the flexure 29 overlaid on the surface of the metallic plate 34 as well as flexible printed circuit board 38 overlaid on the surface of the flexure 29. The flexure 29 and the flexible printed circuit board 38 are thus fixed to the load beam 26 based on molding of the resin material. Wiring patterns are formed on the flexible printed circuit board 38 to connect the write head element and the read head element to a signal processing circuit, not shown.

The head suspension assembly 18 is exposed to a high speed airflow during the rotation of the magnetic recording disk 13. Vibrations based on torsional deformation and/or flexural deformation are caused at the rigid portion 27 of the load beam 26 in response to the influence of the high speed airflow. Since the elastic films 35, 36 are formed to extend over the front and back surfaces of the rigid portion 27, the resonance to the vibrations induced through torsional deformation and/or flexural deformation can be attenuated based on damping performance of the elastic films 35, 36. As a result, the flying head slider 21 is prevented from shifting away from a predetermined position. The write head element and the read head element can thus be positioned with a higher accuracy.

In particular, the thickness of the first and second elastic films 35, 36 gets reduced at a location nearer to the edge of the metallic plate 34 in the head suspension assembly 18. Specifically, the outer surfaces of the first and second elastic films 35, 36 cooperate to form a streamlined outline on the load beam 26 in the lateral direction. The streamlined outline of the load beam 26 serves to prevent generation of swirl in the airflow flowing along the load beam 26. The vibration is thus sufficiently suppressed in the load beam 26.

As shown in FIG. 2, the head suspension assembly 18 allows incorporation of an elastic piece 39 connecting the rigid portion 27 to the base plate 25. The elastic piece 39 may extend from the rigid portion 27 to the base plate 25 without contacting the elastic deformable portion 28. The elastic piece 39 may be integrally formed in the second elastic film 36, for example. The elastic piece 39 serves to attenuate vibration caused by the deformation of the elastic deformable portion 28.

Figure 4:
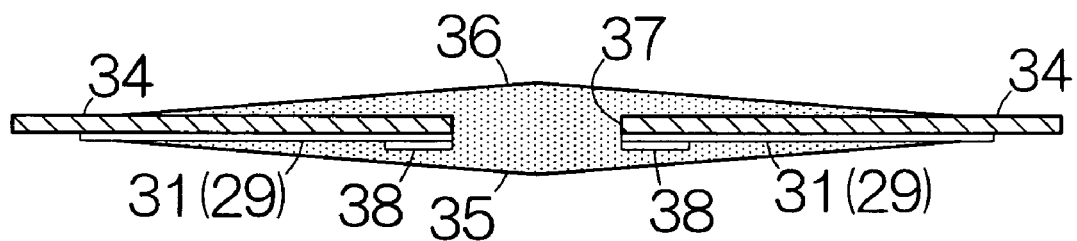
FIG. 4 is an enlarged sectional view, corresponding to FIG. 3, illustrating first and second elastic films according to a modified example.
Figure 5:
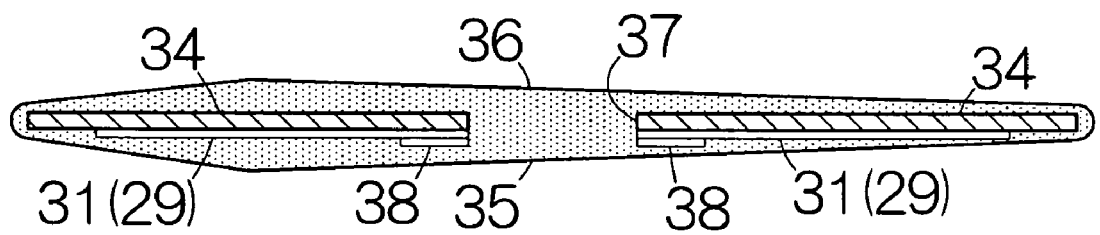
FIG. 5 is an enlarged sectional view, corresponding to FIG. 3, illustrating first and second elastic films according to another modified example.

As shown in FIG. 4, the first and second elastic films 35, 36 may be separated around the edge of the metallic plate 34 in the head suspension assembly 18. In other words, the first and second elastic films 35, 36 may be connected to each other solely inside the throughhole 37. In this case, it is preferable to form the streamlined outline on the load beam 26 in the aforementioned manner. Otherwise, the load beam 26 may be shaped into a wing section in accordance with the direction of airflow, as shown in FIG. 5. The vibration can further efficiently be suppressed in the load beam 26.

Figure 6:
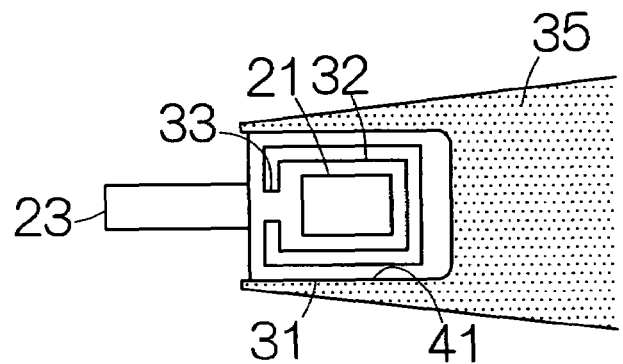
FIG. 6 is an enlarged partial plan view of the head suspension assembly illustrating the first elastic film in the vicinity of a flying head slider.
Figure 7:
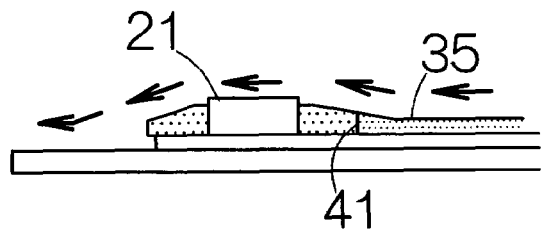
FIG. 7 is an enlarged sectional view of the head suspension assembly schematically illustrating the rectified airflow along the first elastic film.
Figure 8:
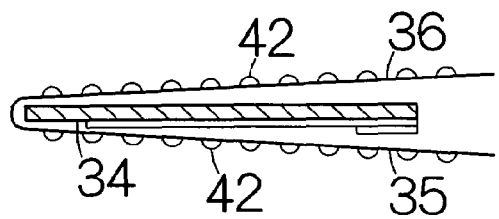
FIG. 8 is an enlarged partial sectional view, corresponding to a part of FIG. 3, illustrating protrusions formed on the surfaces of the first and second elastic films.
Figure 9:
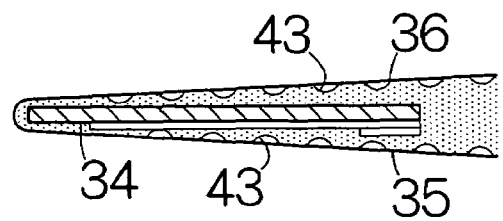
FIG. 9 is an enlarged partial sectional view, corresponding to a part of FIG. 3, illustrating dimples formed on the surfaces of the first and second elastic films.

As shown in FIG. 6, a wall surface 41 may be defined on the first elastic film 35 in the head suspension assembly 18. The wall surface 41 is opposed to the peripheral wall surface of the flying head slider 21. Here, the thickness of the first elastic film 35 may be set equal to that of the flying head slider 21. As is apparent from FIG. 7, the wall surface 41 serves to efficiently rectify airflow, flowing along the flying head slider 21, at the front and rear of the flying head slider 21. Generation of swirl is prevented to the utmost at the front and rear of the flying head slider 21. The vibration can thus efficiently be suppressed in the flying head slider 21. Otherwise, minute domed protrusions 42 may be arranged on the surfaces of the first and/or second elastic films 35, 36, as shown in FIG. 8. The domed protrusions 42 contribute to suppression of generation of swirl. Likewise, minute dimples 43 may be arranged on the surfaces of the first and/or second elastic films 35, 36, as shown in FIG. 9. The dimples 42 contribute to suppression of generation of swirl.

Figure 10:
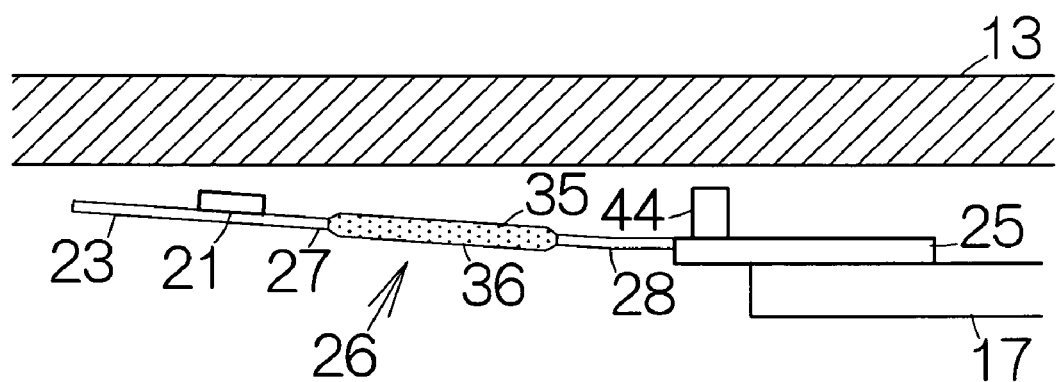
FIG. 10 is a sectional view of the head suspension assembly schematically illustrating an elastic protrusion.

Furthermore, the head suspension assembly 18 allows arrangement of an elastic protrusion 44 in front of the base plate 25, as shown in FIG. 10, for example. The elastic protrusion 44 is opposed to the surface of the magnetic recording disk 13 near the front end of the actuator arm 17. When the actuator arm 17 deforms in response to reception of impact, the elastic protrusion 44 is the first member allowed to contact the surface of the magnetic recording disk 13. The elastic protrusion 44 thus serves to prevent the magnetic recording disk from damages. The elastic protrusion 44 may be continuous the aforementioned elastic piece 39.

What is claimed is:

1. A head suspension for a head slider, comprising:
   a base material of a load beam;
   a through hole formed in the base material;
   a first elastic film extending on a front surface of the base material; and
   a second elastic film extending on a back surface of the base material, the second elastic film being connected to the first elastic film via the through hole.

2. The suspension according to claim 1, wherein at least one of the first and second elastic films has a thickness getting smaller at a location nearer to an edge of the base material.

3. The suspension according to claim 2, wherein outer surfaces of the base material and the first and second elastic films cooperate to form a streamlined outline.

4. The suspension according to claim 3, wherein minute protrusions are located over at least one of the outer surfaces of the first and second elastic films.

5. The suspension according to claim 3, wherein minute dimples are located over at least one of the outer surfaces of the first and second elastic films.

6. The suspension according to claim 1, wherein the first elastic film is connected to the second elastic film around an edge of the base material.

7. A head suspension assembly comprising:
   a base material of a load beam;
   a through hole formed in the base material;
   a flexure overlaid on a front surface of the base material, said flexure receiving a head slider;
   a first elastic film extending over the front surface of the base material, said first elastic film covering over the flexure; and
   a second elastic film extending over a back surface of the base material, the second elastic film being connected to the first elastic film via the through hole.

8. The head suspension assembly according to claim 7, wherein said first elastic film defines a wall surface opposed to a wall surface of the head slider.

9. A head suspension assembly comprising:
   a base plate;
   a load beam extending forward from the base plate and including a base material;
   a rigid portion defined in the load beam, said rigid portion spaced from the base plate by a predetermined distance;
   an elastic deformable portion defined in the load beam between the rigid portion and the base plate, said elastic deformable portion exhibiting a predetermined elasticity; and
   an elastic piece connecting the rigid portion to the base plate, wherein the rigid portion includes:
   a through hole formed in the base material;
   a first elastic film extending on a front surface of the base material; and
   a second elastic film extending on a back surface of the base material, the second elastic film being connected to the first elastic film via the through hole.

10. The head suspension assembly according to claim 9, wherein said elastic piece is spaced from the elastic deformable portion.

11. The head suspension assembly according to claim 9, wherein said elastic piece is integral to an elastic film extending on a surface of the load beam at the rigid portion.

* * * * *